(12) United States Patent
Farley et al.

(10) Patent No.: US 7,455,584 B2
(45) Date of Patent: Nov. 25, 2008

(54) METHOD FOR POSITIVELY DISCHARGING CROP RESIDUE FROM A COMBINE

(75) Inventors: Herbert M. Farley, Elizabethtown, PA (US); Barry E. Lehman, York, PA (US); Clay T. Brumback, Front Royal, VA (US)

(73) Assignee: CNH America LLC, New Holland, PA (US)

( * ) Notice: Subject to any disclaimer, the term of this patent is extended or adjusted under 35 U.S.C. 154(b) by 213 days.

(21) Appl. No.: 11/375,170

(22) Filed: Mar. 14, 2006

(65) Prior Publication Data

US 2006/0166723 A1 Jul. 27, 2006

Related U.S. Application Data

(62) Division of application No. 10/968,673, filed on Oct. 19, 2004, now Pat. No. 7,066,810.

(60) Provisional application No. 60/517,875, filed on Nov. 7, 2003.

(51) Int. Cl.
 *A01F 12/30* (2006.01)
(52) U.S. Cl. ................................................ 460/111
(58) Field of Classification Search ................ 460/111, 460/73, 77, 66, 114
 See application file for complete search history.

(56) References Cited

U.S. PATENT DOCUMENTS

| | | | | |
|---|---|---|---|---|
| 1,194,839 A | | 8/1916 | Heinemann | 528/491 |
| 1,621,194 A | | 3/1927 | Elder | 460/86 |
| 1,864,772 A | | 6/1932 | Sprague | 460/86 |
| 1,917,536 A | | 7/1933 | McIntire | 460/86 |
| 2,199,488 A | | 5/1940 | Fleming | 130/27 |
| 2,292,650 A | * | 8/1942 | Oehler et al. | 460/97 |
| 2,742,044 A | * | 4/1956 | McPhail | 460/150 |
| 2,937,647 A | | 5/1960 | Allen et al. | 130/26 |
| 3,412,735 A | | 11/1968 | Bichel et al. | 130/21 |
| 3,450,286 A | | 6/1969 | Tessman | 214/522 |
| 3,593,719 A | | 7/1971 | Ashton | 130/21 |
| 3,602,230 A | * | 8/1971 | Knapp | 460/117 |
| 3,616,800 A | * | 11/1971 | Rowland-Hill et al. | 460/66 |
| 3,630,011 A | | 12/1971 | Dunn | 56/126 |
| 3,670,739 A | | 6/1972 | Rowland-Hill | 130/27 T |
| 3,712,309 A | * | 1/1973 | Schmitz | 460/112 |
| 3,742,686 A | * | 7/1973 | Rowland-Hill | 56/12.9 |
| 3,779,251 A | | 12/1973 | Rowland-Hill et al. | 56/126 |

(Continued)

*Primary Examiner*—Árpád Fábián-Kovács
(74) *Attorney, Agent, or Firm*—Michael G. Harms; John William Stader; Patrick M. Sheldrake

(57) ABSTRACT

A system and method for positively discharging crop residue from a combine for precisely and consistently delivering crop residue from the threshing and separating area of a combine to the combine's residue handling system or outwardly from the rear of the combine and onto the harvested field below as a windrow. The present invention can include, or operate in cooperation with, a discharge mechanism, such as a conventional discharge beater, which delivers at least some of the crop residue to a conveying mechanism of the system. The system also includes a guide mechanism including a door arrangement configurable in several alternative configurations for receiving and merging and regulating crop residue flow from the discharge mechanism and the conveying mechanism, and directing the merged flow to a desired processing mechanism, such as, but not limited to, a chaff spreader, a straw chopper and/or spreader, etc.

6 Claims, 16 Drawing Sheets

U.S. PATENT DOCUMENTS

| | | |
|---|---|---|
| 4,137,923 A | 2/1979 | Druffel et al. .............. 130/27 R |
| 4,292,795 A | 10/1981 | Linn ........................... 56/503 |
| 4,637,406 A * | 1/1987 | Guinn et al. ................ 460/112 |
| 4,669,489 A * | 6/1987 | Schraeder et al. ........... 460/112 |
| 4,913,679 A | 4/1990 | Bender ....................... 460/112 |
| 5,021,028 A * | 6/1991 | Kersting et al. .............. 460/85 |
| 5,021,030 A * | 6/1991 | Halford et al. ............. 460/111 |
| 5,232,405 A | 8/1993 | Redekop et al. ............. 460/112 |
| 5,501,635 A * | 3/1996 | Niermann ................... 460/112 |
| 5,797,793 A * | 8/1998 | Matousek et al. ........... 460/111 |
| 5,833,533 A * | 11/1998 | Roberg ....................... 460/112 |
| 5,941,768 A * | 8/1999 | Flamme ...................... 460/114 |
| 6,656,038 B1 | 12/2003 | Persson ...................... 460/112 |
| 6,719,627 B2 * | 4/2004 | Wolters et al. .............. 460/111 |
| 2002/0077163 A1 | 6/2002 | Buermann et al. .......... 460/112 |

* cited by examiner

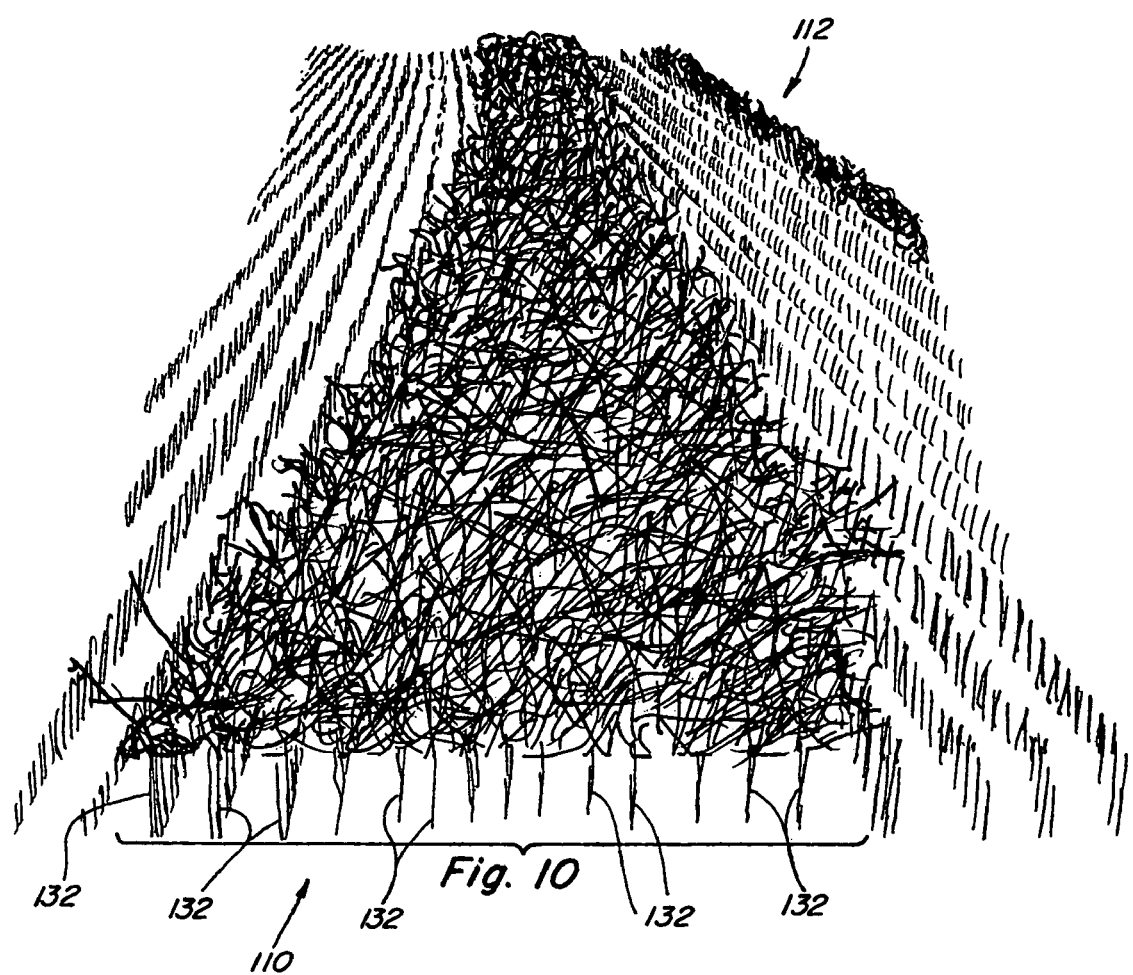

METHOD FOR POSITIVELY DISCHARGING CROP RESIDUE FROM A COMBINE

This divisional application claims priority under 35 U.S.C. § 120 from U.S. patent application Ser. No. 10/968,673 filed on Oct. 19, 2004 now U.S. Pat. No. 7,066,810 by Herbert M. Farley et al. with the same title, the full disclosure of which is hereby incorporated by reference. U.S. patent application Ser. No. 10/968,673 filed on Oct. 19, 2004 by Herbert M. Farley et al. claims priority from U.S. Provisional Patent Application Ser. No. 60/517,875, filed Nov. 7, 2003.

TECHNICAL FIELD

The present invention relates generally to a system and method for positively discharging crop residue from an agricultural combine, the system and method allowing for precise and consistent delivery of crop residue from the threshing and separating area of a combine to the residue handling system or outwardly from the rear of the combine in a windrowing configuration.

BACKGROUND ART

Agricultural combines are well known in the art for harvesting and threshing various agricultural crops, including for example, wheat, soybeans, corn, etc. Usually, agricultural combines include a harvesting apparatus, an infeed mechanism, a separating apparatus and a cleaning apparatus. In operation, the harvesting apparatus reaps the crop, which is planted in the ground. After reaping, the infeed mechanism feeds the crop to the separating apparatus.

Typically, the separating apparatus in a rotary combine includes at least one rotor, which can extend axially (front to rear) or transversely within the body of the combine, and which is surrounded at least in part by a perforated concave having a plurality of apertures. The grain is threshed and separated by the separating apparatus, and the separated grain, together with some impurities, such as chaff, dust, and crop residue particles, are fed to a cleaning system to clean the impurities from the grain. Clean grain is collected below the cleaning system and fed to a grain tank for temporary storage. The clean grain, impurities and smaller elements and particles of the crop residue are separated form the bulk of the crop residue by the separating apparatus and the resulting residue is delivered for processing by a discharge delivery system While the terms "grain" and "crop residue" are used principally throughout this specification for convenience, it should be understood that these terms are not intended to be limiting. Thus "grain" refers to that part of the crop which is threshed and separated from the discardable part of the crop material (e.g. straw), which is referred to as "crop residue".

Traditional discharge delivery systems rely on a device often referred to as a "straw walker" or another device known as a "discharge beater", to transport or convey the separated crop residue rearwardly within a body of the combine to a residue handling system. Generally, straw walkers, which involve crank mechanisms for conveying the crop residue rearwardly through a combine, are relatively slow in operation and thus have a limited material handling capability or rate. The crank mechanisms add complexity and vibration. Discharge beaters "throw" or propel the crop residue away from the separator and toward the rear of the combine. In both instances, the crop residue is generally either discharged directly in its raw form onto the harvested field or is first chopped through a chopper mechanism and then discharged onto the harvested field.

While conventional discharge beaters have adequately conveyed or discharged crop residue to the rear of conventional rotary combines, they are often less than satisfactorily able to consistently deliver crop residue to the residue handling systems of today's new, improved combines. For example, as capacities of modern combines and the volume of material the combine handles per unit of time have continued to increase, conventional discharge beaters have been unable to precisely and consistently throw the increased amounts of crop residue to the rear of the combine. Accordingly, use of a conventional discharge beater alone has been found to be insufficient for many newer combine applications.

To summarize, although technological advances have improved upon some of the inadequacies of conventional discharge systems, problems remain. One problem is that as crop handling capacities of combines have increased, the volume of crop residue that must be conveyed, thrown or propelled rearwardly within the body of the combine, has also increased.

Additionally, for some applications it is permissible or desirable to mix the straw and other crop residue with the chaff. For other applications it is required to handle the straw and chaff separately within the body of the combine and to process and discharge them separately. A problem that has been encountered in regard to these latter applications is that varying moisture content of crop residue, and different types of crop residue, result in a wide range of possible weights of the crop residue and thus the effort needed to properly deliver it to the rear of the combine. Accordingly, if crop residue falls short of the rear of the combine, blockages and interference with the operation of the chaff handling system can occur, thereby causing significant combine down time, decreases in harvesting productivity, and increases in operator and owner dissatisfaction and component failure.

Still further, when windrowing it is often desired for the straw to dry as quickly as possible, such that it can be baled and time will remain for planting and harvesting another crop in the field. However, when windrowing conventionally, the straw is driven or propelled downwardly into the stubble on the field, so as to mix with the stubble and be close to the ground. This can result in longer drying times, and to bale the straw the tines of the straw rake must pass through the stubble close to the ground for removing the straw from the stubble. The straw can also be distributed relatively unevenly, such as in wads and the like, so as to dry unevenly.

Accordingly, the drawbacks of the conventional systems and methods for discharging crop residue from a combine have been known within the industry without any marked improvement to date. Thus, the need exists for the present invention, which provides a system and method for more positively and uniformly controlling and discharging crop residue from a combine.

It is accordingly an objective of the present invention that it provide an improved system and method for positively discharging crop residue from a combine, the system and method allowing for precise and consistent delivery of crop residue from the threshing and separating area of the combine to the residue handling system or the rear of the combine.

It is another objective of the present invention that it provide a system and method for precisely and consistently delivering crop residue to the spreader of a combine for positively discharging raw crop residue, for subsequent spreading to the harvested field below.

It is yet another objective of the present invention that it provide a system and method for precisely and consistently delivering crop residue to the chopper of a combine for positive discharge of the chopped crop residue to the harvested field below.

It is an additional objective of the present invention that it provide a system and method for precisely and consistently discharging crop residue out of the rear of a combine, in a windrow formation, to the harvested field below.

It is yet another objective of the present invention that it provide a system and method for reducing and even alleviating crop residue blockages at the rear of the combine, thereby decreasing combine down time and increasing harvesting productivity and customer satisfaction.

It is still a further objective of the present invention that the system and method for positively discharging crop residue from a combine should also be of a construction which is both durable and long lasting, and it should also require little or no maintenance to be provided by the user throughout its operating lifetime. In order to enhance the market appeal of the system and method for positively discharging crop residue from a combine, it is desirably of inexpensive construction to thereby afford it the broadest possible market. Finally, it is also an objective that all of the aforesaid advantages and objectives be achieved without incurring any substantial relative disadvantage.

SUMMARY OF THE INVENTION

With this invention, a system and method for positively discharging crop residue from a combine, which overcomes many of problems and limitations and provides many of the objectives set forth above, is disclosed.

The present invention generally includes a system and method for precisely and consistently delivering crop residue from the threshing and separating area of a combine to the combine's residue handling system or, alternatively, directly delivering crop residue out the rear of the combine and onto the harvested field below.

It is contemplated that the present invention include, or operate in cooperation with, a discharge mechanism, such as a conventional discharge beater, which delivers crop residue to a conveying mechanism. A guide mechanism, preferably including a door arrangement configurable in several alternative configurations, directs the crop residue received by the conveying mechanism to a desired processing mechanism, such as, but not limited to, a windrow, a chaff spreader, a straw chopper and/or spreader, etc.

It is contemplated that the conveying mechanism can be of variable speed to accommodate different types of crop residue. For example, the conveying mechanism can include a sensor device or devices for detection of predetermined parameters such as variables relating to or representative of conditions of the crop residue being delivered, such as differential weight, volume, or moisture contents of the crop residue. Thus, the conveying mechanism can be adjusted, either automatically or manually, to accommodate any type of crop residue having any type of characteristic, thereby ensuring precise, efficient, and consistent crop residue discharge.

Accordingly, in one embodiment of the present invention, the system is configurable to deliver crop residue to a straw chopper and/or spreader, which subsequently distributes the crop residue to the harvested field below and/or in a swath in a desired relation to the combine. In at least one additional embodiment of the present invention, the system is configurable to deliver crop residue to a chaff spreader device, which incorporates crop residue and chaff together for dispersal to the harvested field below and/or in a swath in a desired relation to the combine.

In a further embodiment of the present invention, the system is configurable to discharge crop residue directly out the rear of the combine, in a windrow formation, to the harvested field behind or below the combine. Additionally, the system can be configured to deposit the straw on the field in a substantially continuous, cohesive, air permeable mat, which is laid more on the stubble on the field in contrast to being driven into and integrated into the stubble. As a resultant advantage, there can be greater air flow through and beneath the stubble for faster drying. As another advantage, the stubble can be cut lower or shorter, for greater straw yield, because the rakes of a straw baler can be set higher as a result of the straw lying more on the stubble as opposed to being more integrated into the stubble.

In yet an additional embodiment of the present invention, the system is configurable so as to reduce or even alleviate crop residue blockages at the rear of the combine, thereby decreasing combine down time and increasing harvesting productivity and customer satisfaction. This is a result, at least in part, of a capability of the present system to convey and guide the crop residue more uniformly or consistently to a selected processing mechanism at or in the rear of the combine, such as a straw chopper, spreader or the like, without heavier or larger elements of the straw, such as wads, vines, and the like, falling onto or into a chaff spreader typically located forwardly of a straw chopper and/or spreader and an outlet used for windrowing. In this latter regard, the conveying mechanism can be positioned partially above the chaff spreader. Also, the conveying mechanism is preferably positioned in rearwardly converging or tapering relation to a crop residue hood ceiling of the body of the combine located above the conveyor mechanism, such that as the crop residue is conveyed rearwardly by the conveying mechanism, it is merged and integrated with lighter or other portions of the crop residue flow which remain airborne longer and thus are not deposited on the conveyor surface. This convergence or taper also reduces the vertical extent or height of the rear end of the space through which the crop residue is conveyed and merged, such that the overall vertical extent or height profile of the flow of the crop residue will be reduced and made more uniform and consistent as it is directed to the processing mechanism or outwardly from the combine for windrowing. In this latter regard, as a result, the crop residue flows or is discharged from the combine in essentially a continuous, cohesive mat, which can be lowered onto field stubble so as to lie thereon and more effectively and rapidly dry, so as to be capable of being raked up and baled sooner compared to straw which is forcefully propelled downwardly and integrated into the stubble.

In a final aspect of the present invention, a method for positively discharging crop residue from a combine is provided. For example, one preferred method of the invention includes steps of threshing and separating crop grain; delivering the threshed crop grain residue toward the rear of the combine; conveying the crop residue to a guide mechanism; and directing the crop residue to a desired processing mechanism for positive discharge from the combine, or outwardly from the rear end of the combine for windrowing. In this latter regard, the guide mechanism preferably includes the door arrangement configurable according to steps of the invention in one configuration for directing or guiding the crop residue into an inlet opening of a chopper, and in another configuration for directing or guiding the crop residue through a rear opening of the combine and onto a field below in a windrow. Also in this latter regard, alternatively the conveying and guide mechanisms can be configured for directing the crop residue into a chaff spreader.

BRIEF DESCRIPTION OF THE DRAWINGS

These and other advantages of the present invention are best understood with reference to the drawings, in which:

FIG. 10 is a representation of a longitudinal view of a windrow formed by the discharge system of FIG. 7;

DETAILED DESCRIPTION OF THE INVENTION

Figure 1:
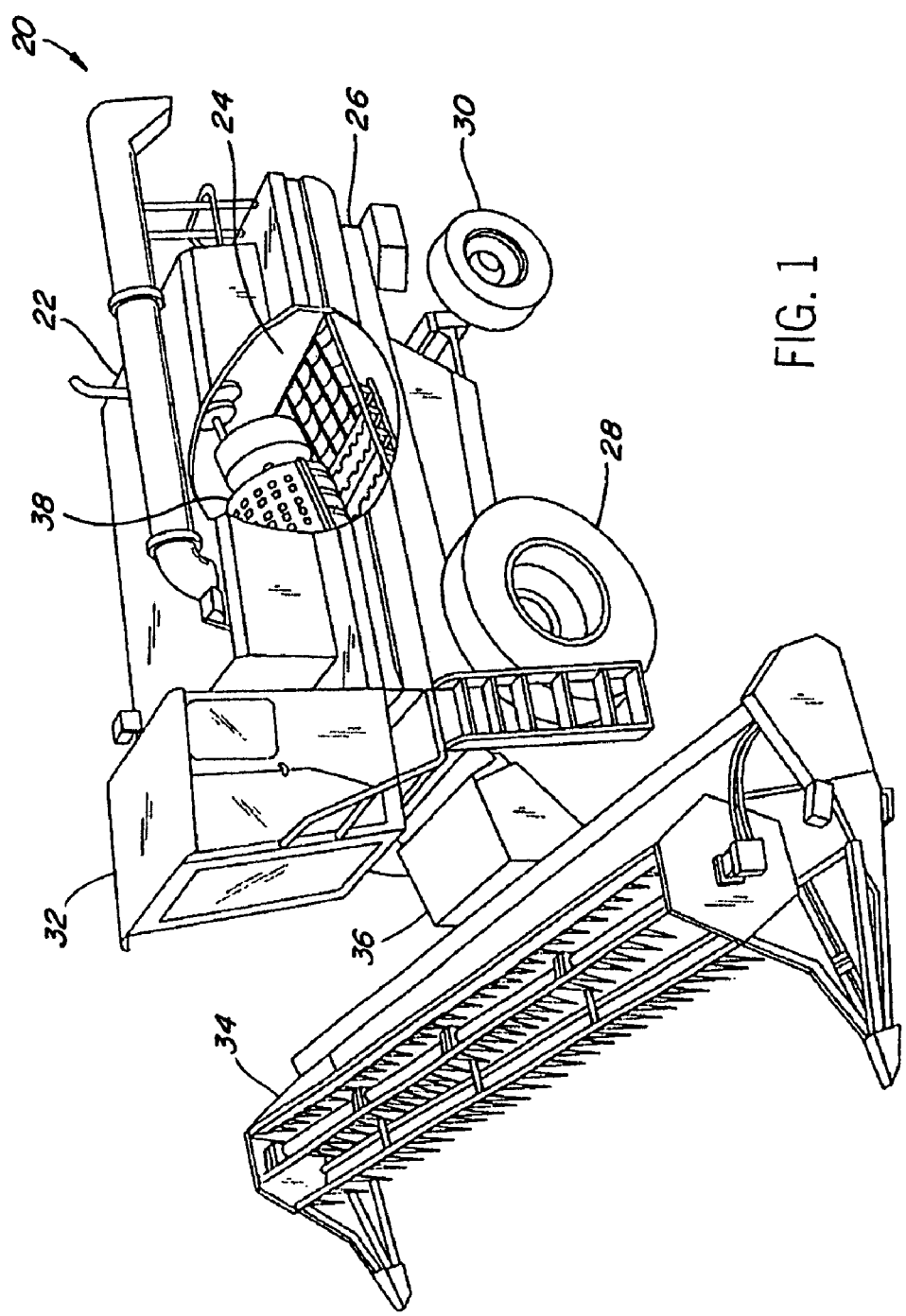
FIG. 1 is a perspective view, partially broken away, of an agricultural combine.

Referring to the drawings, FIG. 1 shows a self-propelled rotary combine 20 that includes a housing or body 22 defining an internal open area or space 24. While a conventional rotary combine is shown, it is anticipated that the present invention could be used with any type of combine, such as a conventional combine having a threshing cylinder and separation beaters (not shown) or a hybrid combine having a threshing cylinder and rotors (not shown). However, for ease of explanation, the present invention will be discussed hereinafter in conjunction with a self-propelled rotary combine 20 as illustrated by FIG. 1.

The body 22 of the combine 20, which can include a supporting frame 26, is supported on front drive wheels 28 and steerable rear wheels 30. The combine 20 is powered by an engine (not shown) and controlled from an operator's station 32.

A crop harvesting apparatus, otherwise referred to as a header 34, and an infeed mechanism 36 are attached at a forward end of the combine 20. The infeed mechanism 36 feeds crop materials to a rotor assembly 38 enclosed within the body. One example of a rotary combine configured with a rotary assembly is disclosed in U.S. Pat. No. 5,489,239, titled "Rotary Combine" and which issued Feb. 6, 1996 to Case Corporation, and which is hereby incorporated herein by reference.

Figure 2:
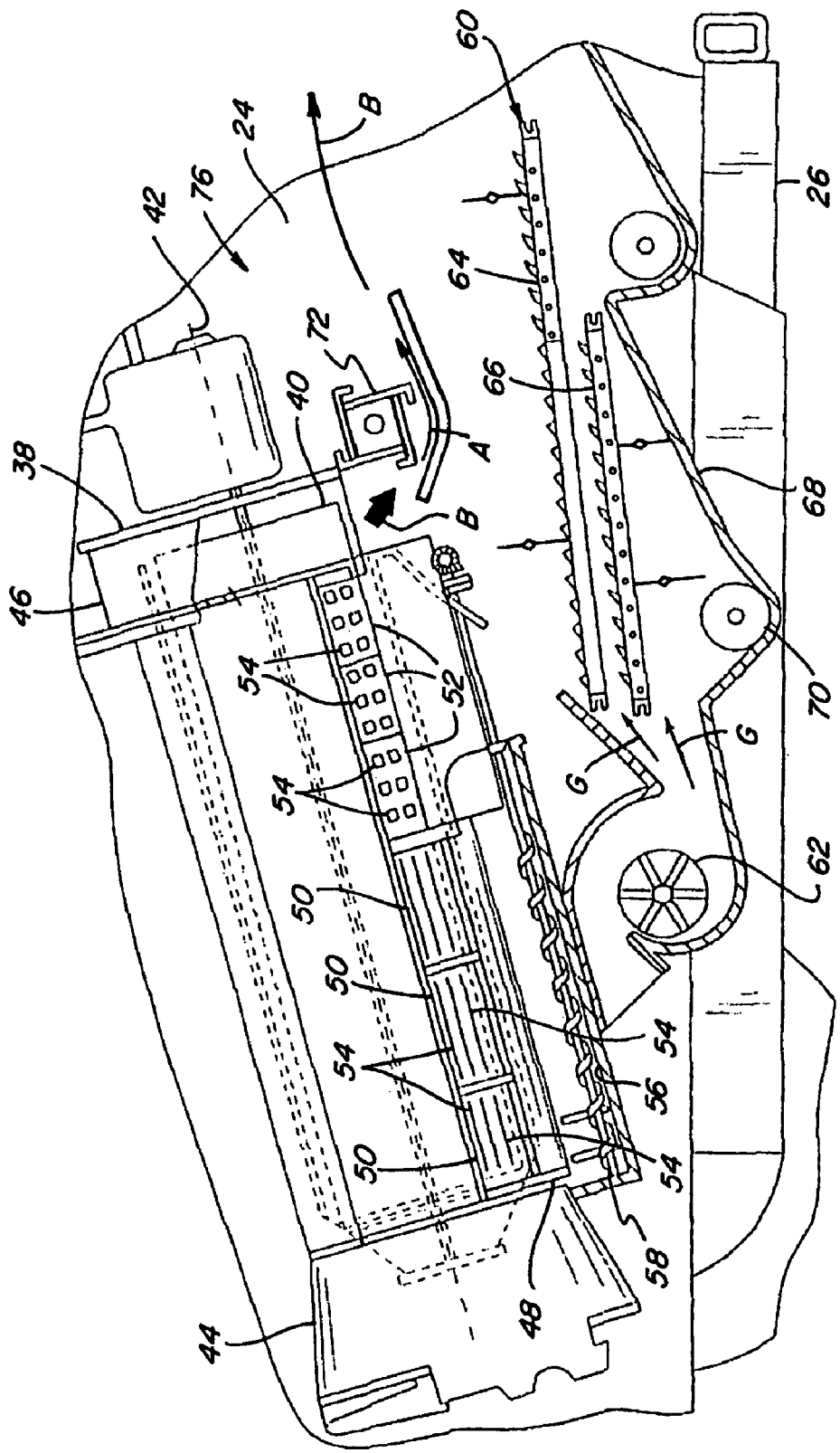
FIG. 2 is a fragmentary left side view of a separating apparatus and cleaning system of the combine shown in FIG. 1.

As best shown in FIG. 2, the rotor assembly 38 is preferably configured as a single axial unit that threshes and separates crop materials presented thereto into grain and other materials. However, it should be appreciated that the rotary combine 20 could be configured with more than one rotor assembly 38, for example, with two units arranged in a parallel configuration. The rotor assembly 38 is mounted in the internal area defined by the body (FIG. 1).

The rotor assembly 38 includes a rotor 40 with a longitudinal extent rotatably mounted to the body 22 about a longitudinal axis of rotation 42, which extends axially along the length of the combine 20. It should be understood that the term "longitudinal" means of or relating to length or the lengthwise dimension. It should also be understood that the rotor 40, with its longitudinal extent, could be mounted within the body 26 so as to extend laterally from side-to-side within the combine 20.

It should be understood that the terms "left side," "right side," "left," "right," "front," "rear," "upper," "lower," "top," and "bottom," and their derivatives, as used herein, are intended to indicate directions relative to the views presented in the Figs., and in particular, from a perspective when viewing the rotary combine 22 of FIG. 1, and the internal components thereof, from the steerable rear wheels 30 toward the crop harvesting apparatus.

Referring back to FIG. 2, between the upstream, or front end 44, and the downstream, or rear end 46, of the rotor assembly 38, the crop material is threshed as it spirals around the rotor 40 against a concave 48 disposed at least partially, circumferentially around the rotor 40. The rotor 40 can be dimensioned with a broad range of diameters, depending on the desired size and performance characteristics of the combine 20.

For example, suitable rotors 40 may have a diameter in the range of fifteen inches to thirty inches, although it should be appreciated that other diameters, larger and smaller, would also work for the purposes of this invention. The rotor 40 is configured with suitable instrumentalities (not shown) mounted on the peripheral surface thereof that cooperate with the concave 48 to thresh the crops introduced therebetween.

As shown in FIG. 2, the concave 48 can include various semi-cylindrical concave inserts 50 and grate inserts 52, which are generally provided in a lower arcuate fashion and supported by a concave frame (not shown). The rotor 40 is preferably made of steel, and is generally rotated at speeds of between 150 to 1500 revolutions per minute, depending on the type of crop being threshed, and the conditions under which the threshing is being performed. It should be understood, however, that the speed of the rotor 40 is not critical to the operation of the invention, and that other speeds, faster and slower, may be desired and suitable for the purposes of the present invention without detracting or departing from the scope thereof.

Figure 3:
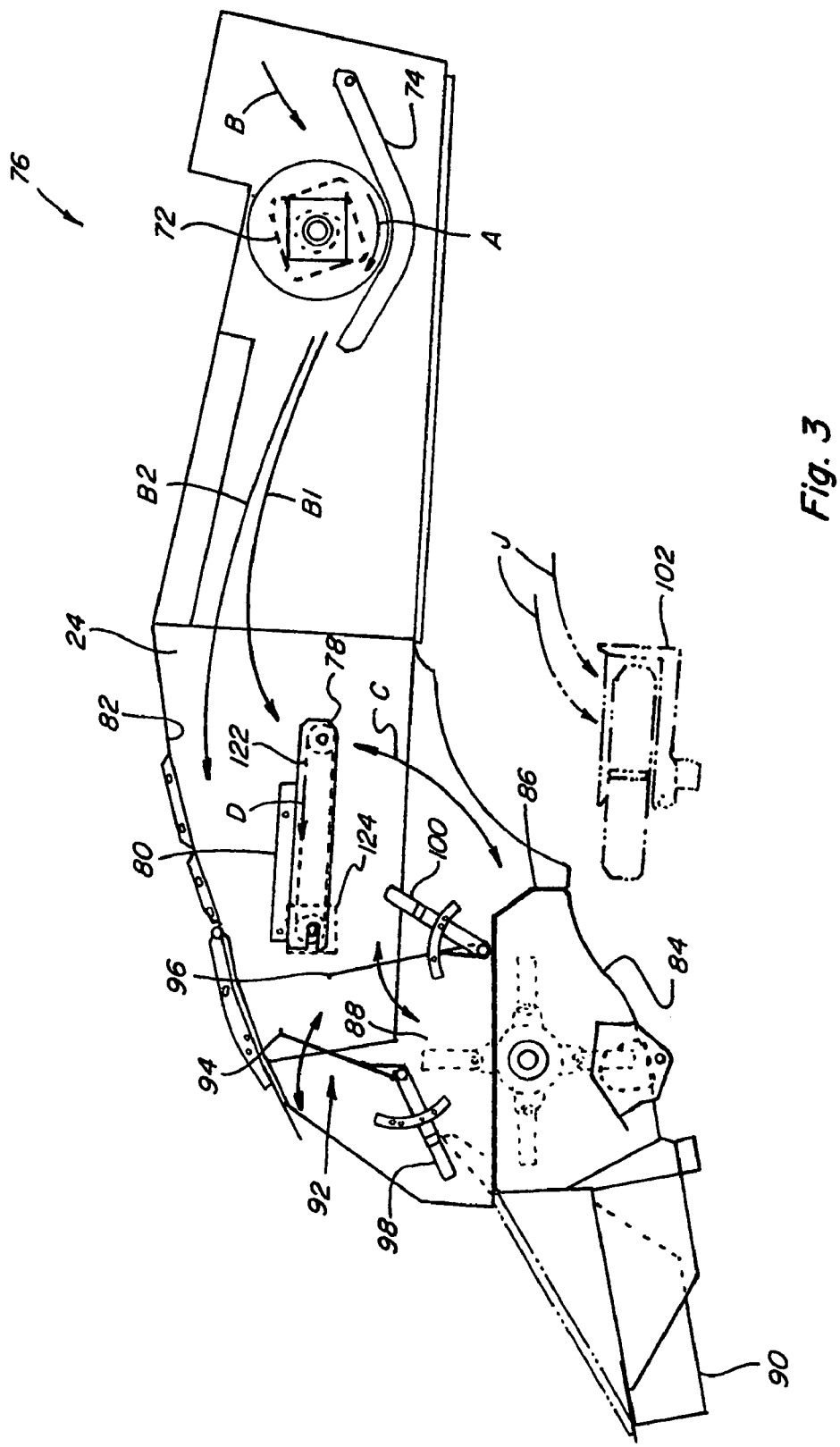
FIG. 3 is a simplified right side view of an interior space of a rear end of the combine, showing a rotary beater for propelling crop residue from the separating apparatus of FIG. 2, and a discharge system of the combine according to the invention.

Still referring to FIG. 2, the concave inserts 50 and grate inserts 52 each have a plurality of apertures 54 that allow the grain to be separated from the other crop material as the grain passes through the apertures 54. Most of the grain drops onto a grain pan 56. The grain is thereafter-conveyed rearward from the grain pan 56 by an auger mechanism 58 (a grain pan can also be used to transport the grain) for subsequent cleaning and collection by a cleaning system 60 and a discharge system 76 according to the invention, as best illustrated in FIG. 3.

The cleaning system 60 cleans chaff, crop residue, tailings and other foreign material from the grain. For example, the cleaning system 60 can include a cleaning fan 62, a chaffer sieve 64, a grain sieve 66, and a clean grain collector 68. A suitable auger mechanism 70 can direct clean grain from the clean grain collector 68 into a hopper or grain bin (not shown). The cleaning fan 62 directs a flow of air, denoted by arrows G, upward and rearwardly through sieves 64 and 66, for blowing the chaff and other particles from the grain.

Crop residue and other waste crop material are impelled rearwardly out of the discharge or rear end 46 of the rotor assembly 38 by the discharge system 76. For example, as illustrated in FIG. 2 and more specifically in FIG. 3, a rotary beater 72 rotates, as denoted by arrow A to "throw" or propel, as denoted by arrows B1 and B2, an airborne flow of crop residue and other waste material, particularly straw, through the space 24 rearwardly toward the rear end of the space 24 and the combine 20. The discharge beater 72 is preferably positioned above a beater concave 74 to facilitate this function. Such airborne flow of the crop residue will typically comprise elements of varying size, mass and other characteristics that will influence the distance that the elements of the crop residue will be thrown or propelled through the space 24. For instance, it can be expected that a wad or wads of weeds, vines or tough or green crop residue propelled rearwardly by beater 72 will not travel as far through space 24 compared to lighter individual elements of the crop residue such as individual straws and the like. This can be due to the larger size of the wad, and also greater weight compared to the lighter elements. As a result, it has been found that such wads and larger and/or heavier elements of the crop residue can have a tendency to fall down at more forward locations within the space 24, including over a more forwardly located chaff spreader device 102, so as to cause problems such as interfering with operation of, and/or reducing the efficiency of, the cleaning system 60 and/or the chaff spreader 102, including blocking chaff flow into the spreader device 102, even to the point so as to require manual removal, which can cause machine downtime which can reduce productivity and cause dissatisfaction among users and owners of the combine.

Referring also to FIGS. 3 through 9 and 11 through 14, the discharge system 76 further preferably includes a conveying mechanism 78, which overcomes and eliminates at least some of the problems set forth above. The conveying mechanism 78 is preferably mounted to the body of the combine 20 by a conveyor mount 80, which can comprise, for example, a pair of brackets which mount the conveying mechanism 78 to the opposite sides of body 22 for supporting conveying mechanism 78 in a position such as that shown, in spanning relation to a portion of the space 24 just below, or in a lower region of, a path of the rearward flow generated by the beater 72, denoted by the arrows B1 and B2. Advantageously, the conveying mechanism will be positioned in the path of elements of the crop residue flow B, B1 and B2 that would fall short of a desired destination therefor, such as a rearwardly located chopper and/or spreader or an outlet opening, and so as to prevent or limit occurrences of the problems set forth above including blocking and interfering with the operation of other systems. At the position shown, the front end of the conveying mechanism 72 is located above at least a rear end of a chaff spreader device 102, which coincides with a location of most anticipated short falls of crop residue flow B, B1 and B2.

Figure 14:
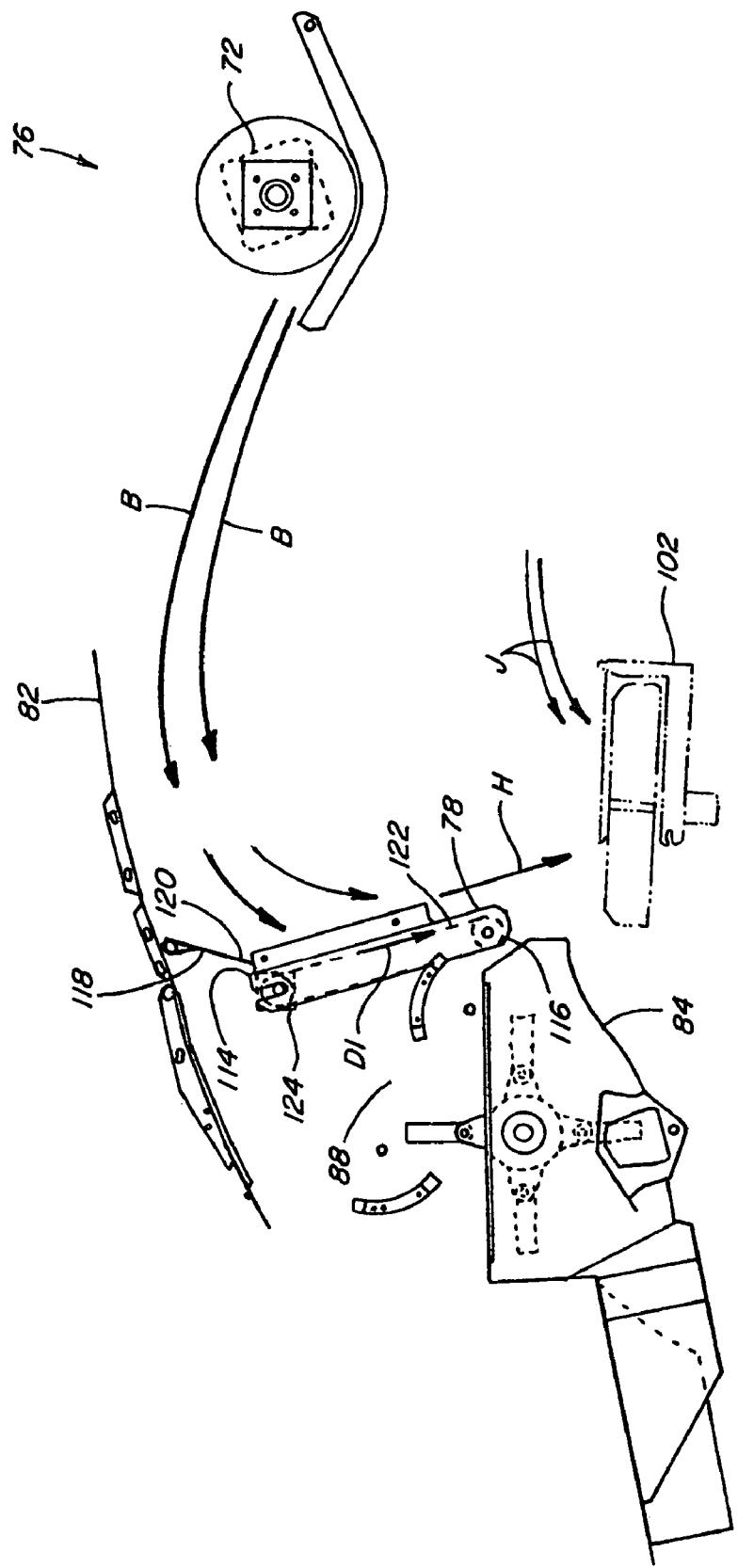
FIG. 14 is an alternative embodiment, shown in a simplified right side view, of the discharge system of FIG. 12, illustrating the pivotal nature of the conveying mechanism.

The conveying mechanism 78 can be optionally mounted for pivotal movement in an upward and downward direction, as denoted by arrow C in FIG. 3, for operation in an alternative position, as shown in FIG. 14.

The conveying mechanism 78 includes a conveyor drive 124, which can be, for instance, a well known, commercially available hydraulic motor, an electric motor, etc., drivingly rotatable for continuously moving an upwardly facing conveyor surface 122 of conveyor mechanism 78 in the rearward direction, as denoted by arrow D. Conveyor surface 122 is preferably a surface of an endless belt, chain or the like which encircles rollers at the opposite ends of conveying mechanism 78, and can have a generally smooth surface, or a textured surface, or include raised elements thereon, as desired or required for a particular application. The conveyor drive 124 is shown connected in driving relation to one of the rollers for moving conveyor surface 122 in the well known manner.

The conveying mechanism 78 can additionally be optionally rotatable by drive 124 at variable speeds, either under manual control, or automatically responsive to and in adjustment for different characteristics of the crop residue being received and/or other conditions, as represented by one or more predetermined parameters, as will be discussed in reference to FIG. 15. Generally, the conveying mechanism 78 is bounded on its upper side by a crop residue hood ceiling 82, which prevents crop residue from escaping upward. The conveying mechanism 78 cooperates with crop residue hood ceiling 82 for merging portions of, shaping, and regulating crop residue flow B, B1 and B2, as will also be explained.

Located generally below the conveying mechanism 78 are crop residue processing mechanisms. For example, a crop residue spreader and/or chopper, represented by a chopper 84 is preferably present below the conveying mechanism 78. It is contemplated that the chopper 84 can be any conventional chopper currently known in the art or any improved version thereof, for chopping and/or spreading crop residue. Regardless, it is preferred that the chopper 84 include a chopper housing 86 having an inlet opening 88 for receipt of crop residue, such as straw. Located rearward of the chopper 84 is preferably a chopper spreader band or guide 90, for directing the crop residue discharged from chopper 84 in a desired manner over a field.

Focusing on FIG. 3, it can be seen that a guide mechanism 92 is present. The guide mechanism 92 preferably, but not necessarily, includes a door or guide arrangement including at least one pivotal guide or door, such as a pivotal chop/swath door 94 and a pivotal deflector/kickback door 96, which are pivotable as illustrated by the arrows associated with the respective doors 94, 96. The chop/swath door 94 and the deflector/kickback door 96 are connected to handles 98, 100, respectively, preferably located on the exterior of body 22 and movable for manually positioning the chop/swath door 94 and deflector/kickback door 96 relative to the chopper 84, to a variety of positions, as shown. Here, it should be noted that the positions of doors 94 and 96 are shown in FIG. 3 in random pivotal positions to illustrate the pivotability thereof.

However, it should be appreciated that the guide mechanism 92 could also be remotely automatically, electronically, hydraulically, or mechanically operable and positionable. For instance, each of the doors could be controlled using a common commercially available rotary actuator, a linkage arrangement, or the like (not shown). Finally, located forward of the chopper 84 is a conventional chaff spreader mechanism or device 102, for receiving a flow of chaff, denoted by arrows J, propelled rearwardly from cleaning system 60 by rearward and upward flow of air G (FIG. 2) from cleaning fan 62 in the well known, conventional manner.

Figure 4:
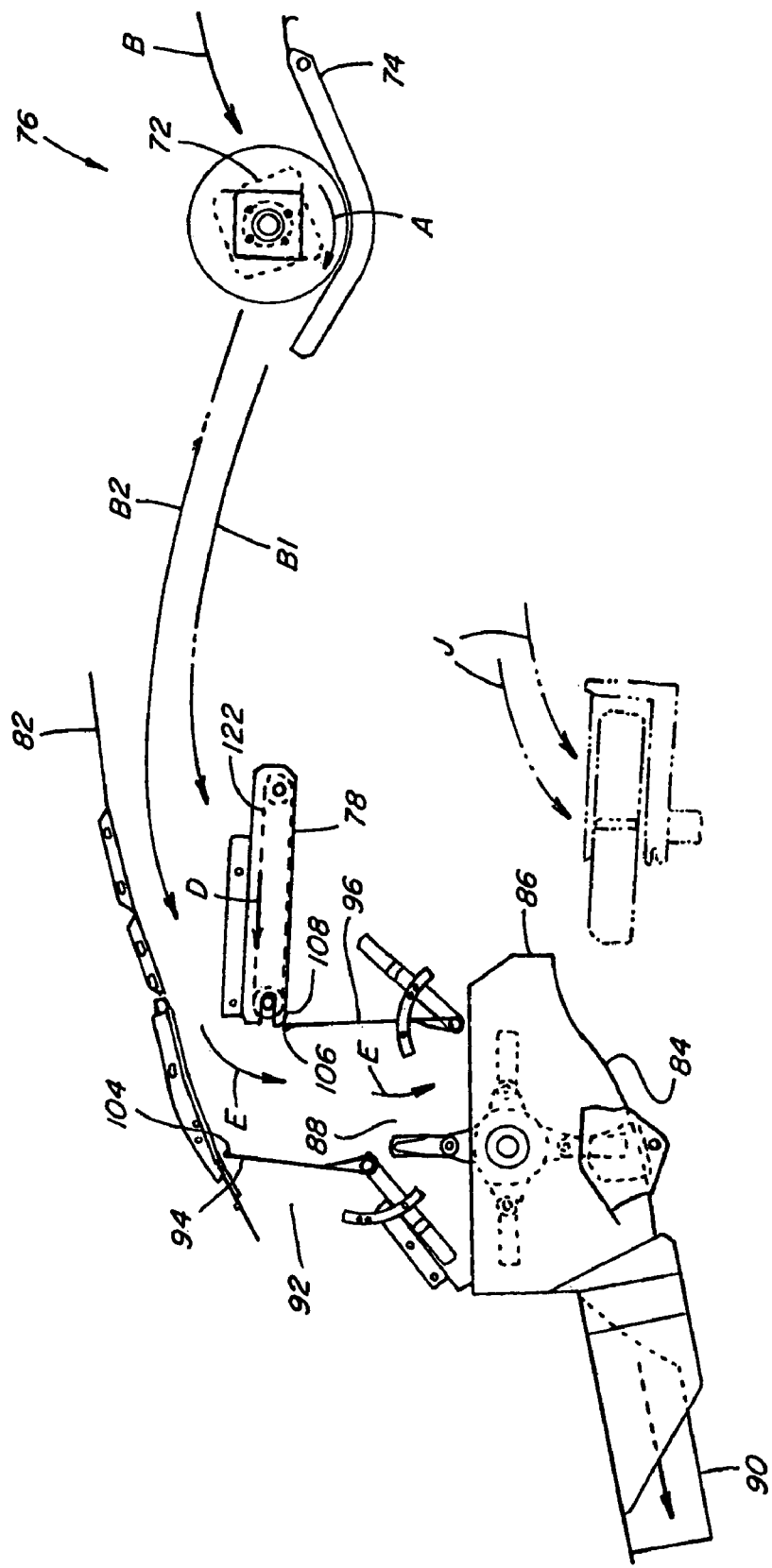
FIG. 4 is another simplified right side view of the interior space and discharge system of FIG. 3, with the discharge system configured in a "chop mode" for directing crop residue into a chopper of the combine.
Figure 5:
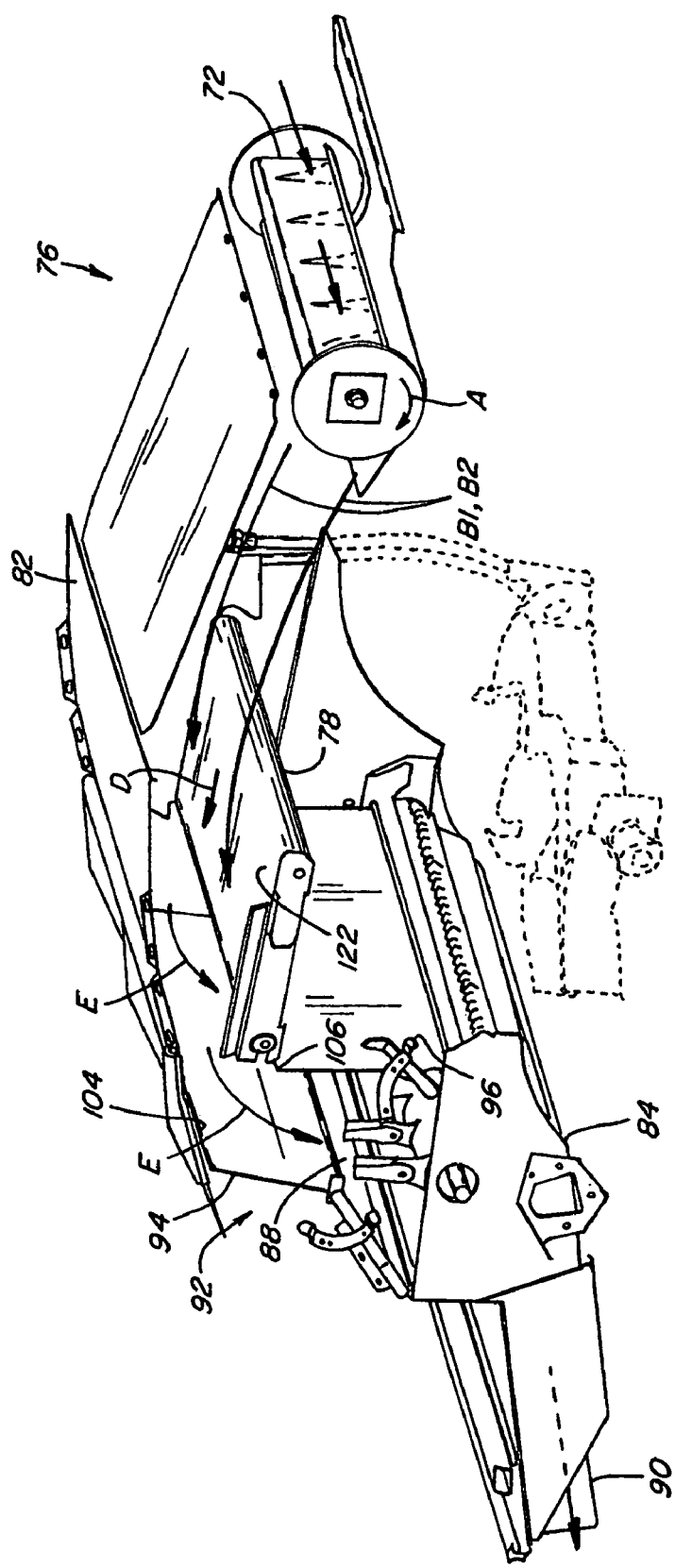
FIG. 5 is a simplified right front isometric view of the discharge system of FIG. 4 configured in the chop mode.
Figure 6:
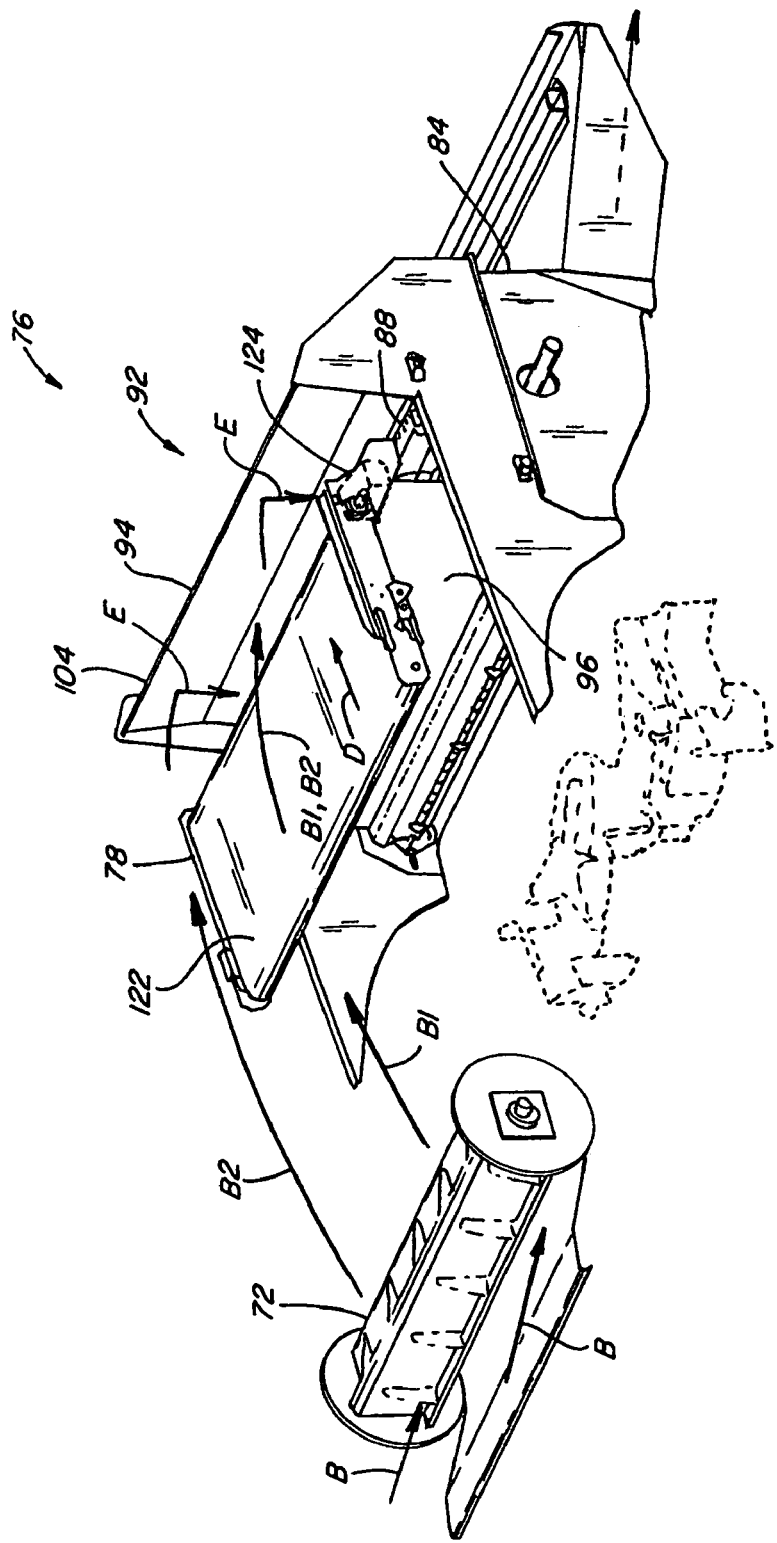
FIG. 6 is a simplified left front isometric view of the discharge system of FIG. 4.
Figure 7:
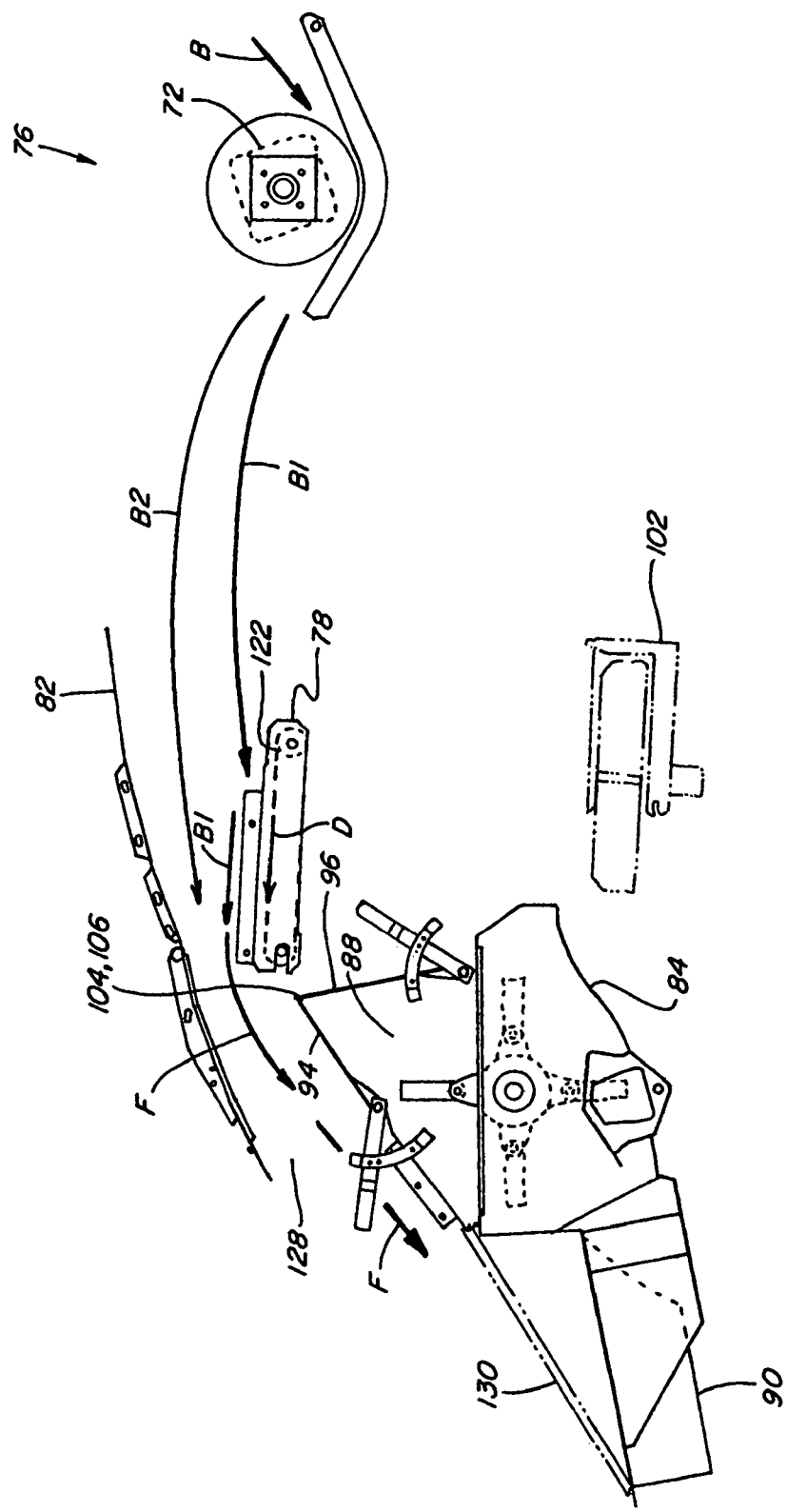
FIG. 7 is another simplified right side view of the discharge system of FIG. 3, configured in a "windrowing mode" for directing crop residue through a rear opening of the body of the combine.
Figure 8:
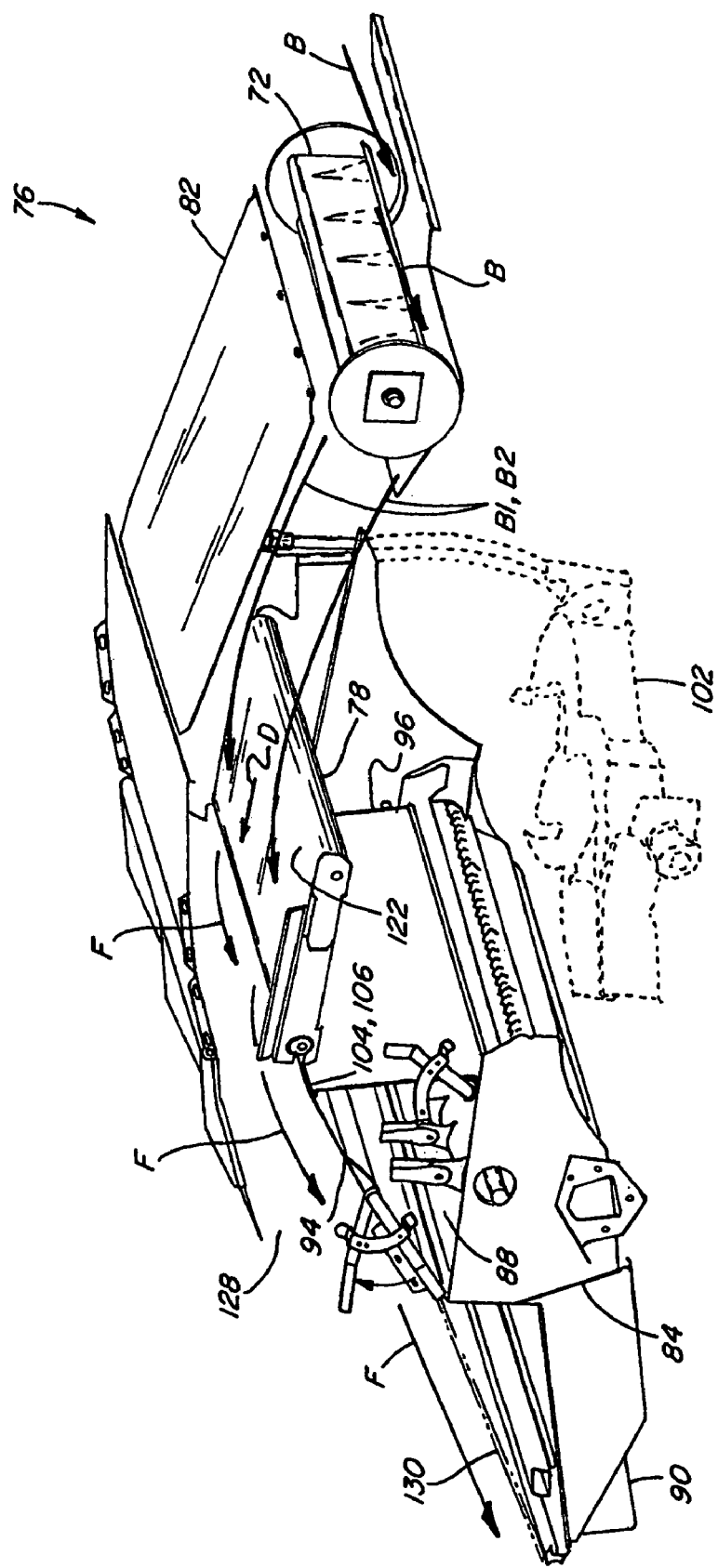
FIG. 8 is a simplified right front isometric view of the discharge system of FIG. 7.
Figure 9:
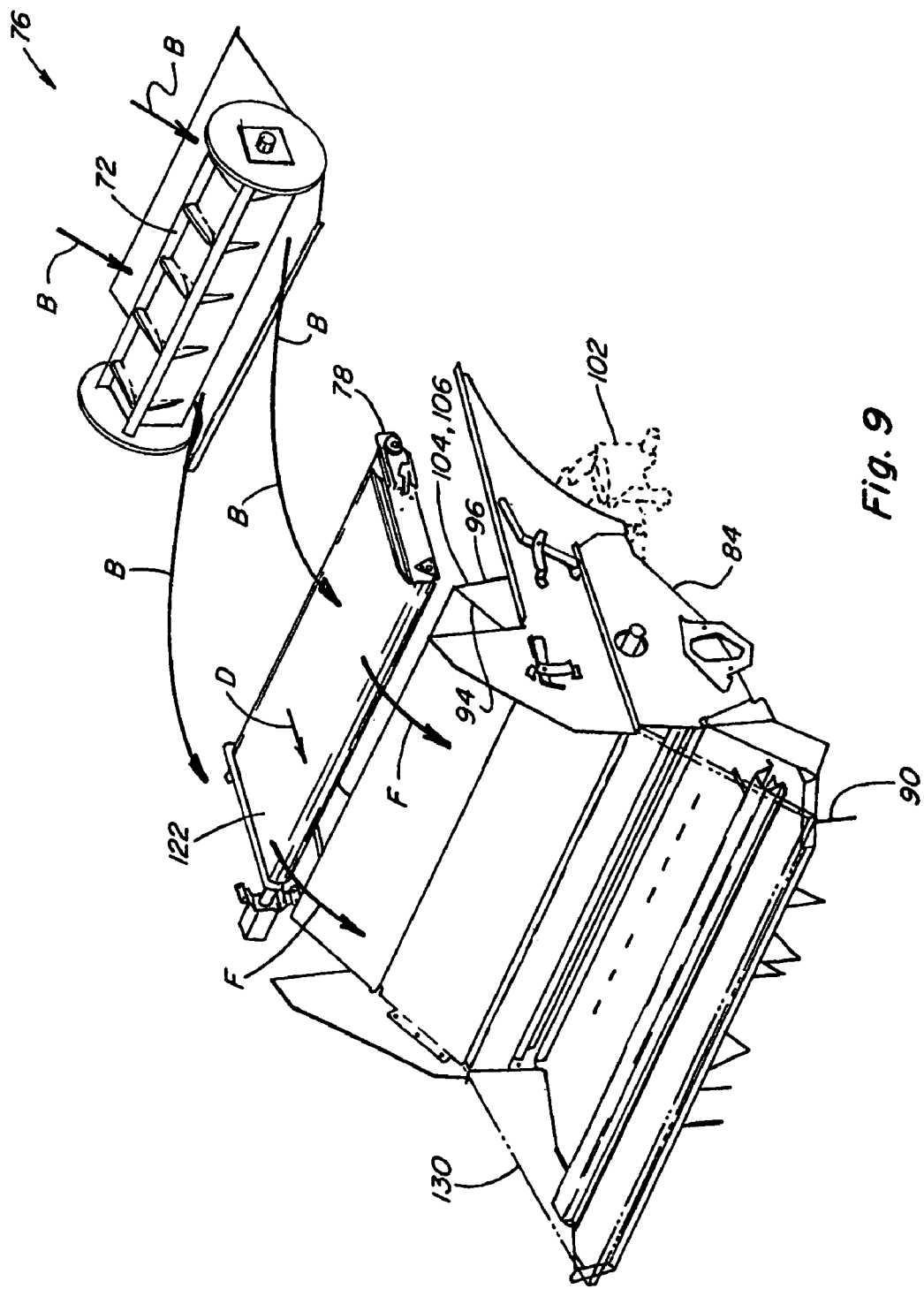
FIG. 9 is a simplified right rear isometric view of the discharge system of FIG. 7.

Turning now to FIGS. 4-6, the "chopping mode" embodiment of the discharge system 76 of the present invention is illustrated. FIGS. 4-6 show the conveying mechanism 78 mounted adjacent to and in spaced relation below, the crop residue hood ceiling 82 of the combine. As illustrated, it is contemplated that the discharge beater 72 will throw or propel a flow of crop residue rearwardly, denoted by arrows B1 and B2, such that some or all of the crop residue, particularly larger elements and wads thereof, represented by arrow B1, will fall or land upon the conveying mechanism 78, and more particularly, on conveyor surface 122, which is moving rearwardly as denoted by arrow D. The moving surface 122 will carry the crop residue deposited thereon rearwardly so as to effectively be merged or mixed with the still airborne crop residue flow B2, which is at the same time being guided downwardly by the hood ceiling 82, so as to reduce the overall vertical extent of the crop residue flows B1 and B2, so as to be more uniform and consistent. The rearward powered movement of surface 122 of conveying mechanism 78 thus facilitates the collection and consolidation or funneling of the crop residue discharge, and positively delivers it, by way of the guide mechanism 92, to the chopper 84, as denoted by arrows E. In this regard, it should be appreciated that elements of the crop residue flow B1 that fall onto conveyor surface 122 will often have little or no useful remaining rearward velocity or momentum, and thus will be accelerated and positively propelled rearwardly to the rear end of the conveyor surface 122 and be combined with flow B2. The rearward movement of and energy imparted to the thus conveyed crop residue of flow B1 will facilitate the merging and mixing thereof with the still airborne portions of the crop residue flow B2, and also the smooth feeding of the combined and merged crop residue flow E into the chopper 84. In this latter regard, the reduced or controlled vertical extent of the combined crop flows B1 and B2 facilitate more uniform, controlled and concentrated entry and feeding of the crop flow E at a desired angle and location into inlet opening 88 of the chopper 84. And, in the event of receipt of a particularly large volume or wad of crop material, the combination of the powered conveying mechanism 78 positively driving the crop material rearwardly and the reducing of the vertical extent thereof will have the effect of throttling and funneling the crop material into the chopper 84 so as to regulate the flow of the crop material inducted therein and reduce the occurrence of induction of wads and large volumes that can overload the chopper and cause problems such as excessive drive belt slippage and resultant wear.

Notably, in this embodiment, the chop/swath door 94 is positioned generally vertically so that its leading edge 104 abuts or contacts the crop residue hood ceiling 82, for preventing passage of the crop residue rearwardly of door 94. Similarly, the deflector/kickback door 96 is also positioned generally vertical so that its leading edge 106 abuts or contacts the bottom rear edge of the conveying mechanism 78 (FIG. 4), for preventing passage of the crop residue forwardly thereunder. The generally vertical positioning of the chop/swath door 94 and deflector/kickback door 96 thus direct crop residue into the chopper inlet opening 88 of the chopper 84 for processing thereby.

Consequently, the chop/swath door 94 disallows exit of the crop residue through the rear of the combine while the deflector/kickback door 96 prevents crop residue material from being thrown forward by the chopper 84. Notably, the chaff from the cleaning system 60 remains segregated from the crop residue discharge and is handled by the chaff spreader device 102, as denoted in FIG. 4 by arrows J, or is delivered directly to the harvested field below the combine.

Turning next to FIGS. 7-10, the "windrow mode" embodiment of the discharge system 76 of the present invention is shown. In the windrow mode, the elements of the crop residue flow B1 and B2 are merged and mixed and consolidated as discussed above by cooperation of conveying mechanism 78 and hood ceiling 82, but instead of being subsequently directed downwardly into chopper 84, the crop residue flow now identified by arrows F, is directed outwardly from the combine through a rear opening 128. To accomplish this, chop/swath door 94 and the deflector/kickback door 96 are pivotally positioned and configured to direct the crop residue flow F over the top of and past the chopper 84, and onto a ramp 130 extending downwardly and rearwardly over the rear end of the chopper 84 and spreader band 90. If the crop flow is sufficiently large, it will be reduced in overall vertical extent or funneled by passage between the rear end of the conveying mechanism 78 and hood ceiling 82 so as to exit the rear end of the combine essentially in the form of a continuous, largely cohesive mat. This mat will flow or ride downwardly and rearwardly over ramp 130 and be laid as a cohesive windrow 110 onto stubble 132 (see FIG. 10) of a harvested field 112 behind the combine. Chaff is spread from the chaff spreader device 102. In this embodiment, the chop/swatch door and the kickback/deflector door 96 converge at their leading edges 104, 106 to create a seal. Accordingly, it is contemplated that generally all the crop residue from the beater (arrows B1 and B2) will be discharged over the chopper 84 to form the cohesive windrow 110, which will rest on the stubble of the harvested field 112.

Figure 10A:
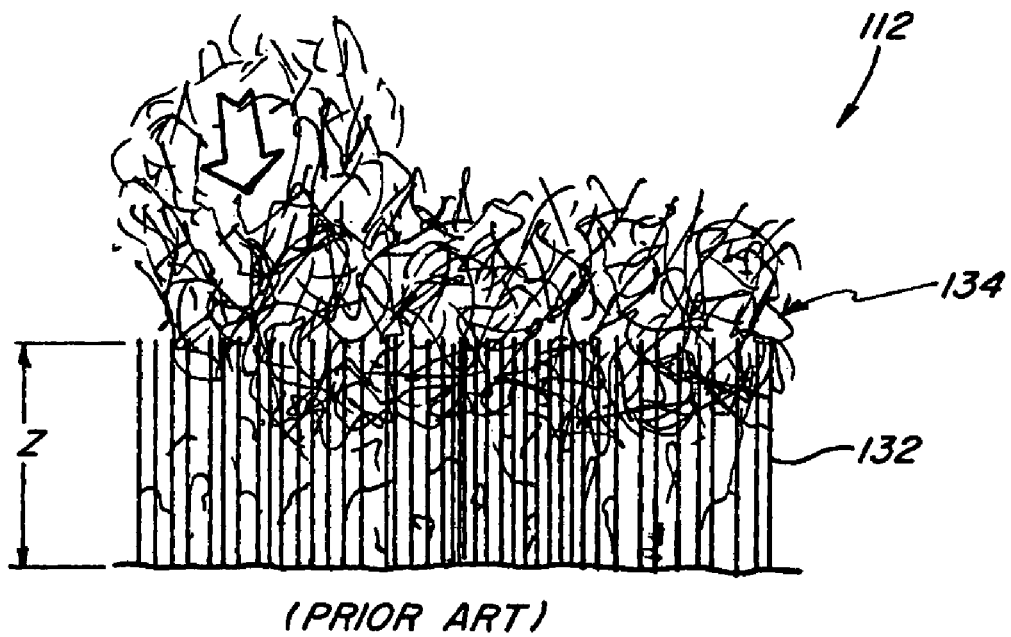
FIG. 10A is a side view representation of a windrow formed in a prior art manner.
Figure 10B:
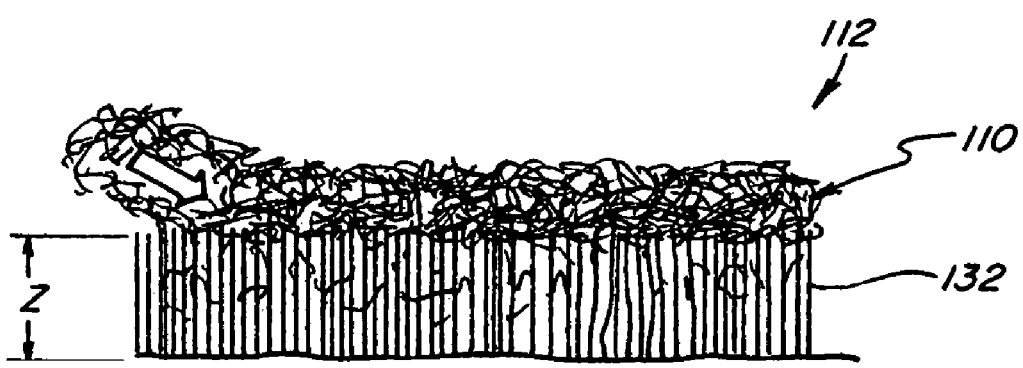
FIG. 10B is a side view representation of the windrow of FIG. 10.

FIGS. 10, 10A and 10B illustrate an advantage of the windrowing capability of the present system FIG. 10A shows a more conventional prior art windrow 134, wherein the crop residue (straw) is blown downwardly into and against the stubble on a field 112, in a non-cohesive manner to form the windrow 134. For such a windrow, the stubble is typically cut to a height, denoted as height Z, of generally from about 8 to 16 inches so as to be capable of receiving and holding the straw. As a result, the straw of the windrow 134 is integrated at least to some extent into the stubble, and, when baled, will have to be raked from the stubble. This is one reason for the height of the stubble.

FIGS. 10 and 10B show the windrow 110 formed by the present invention. Here, the crop residue flow (straw) is more cohesive as it is discharged from the combine, and, as a result, can be laid more as a cohesive, continuous mat on top of the stubble 132. The windrow 110 will likely lie on the stubble, and will integrate therein to some extent, but not to the same extent as if blown into the stubble. As a result, air can move through the straw beneath the stubble more easily, which can result in faster drying times under some conditions. Thus, if the straw dries faster, it can be baled sooner. This can be important when it is desired to plant a second crop in the field.

As another advantage, because the straw is not integrated to the same extent into the stubble, less deep raking is required. As a result, the stubble can be cut shorter. For instance, a height Z of from about 5 to about 10 inches may be possible.

Figure 11:
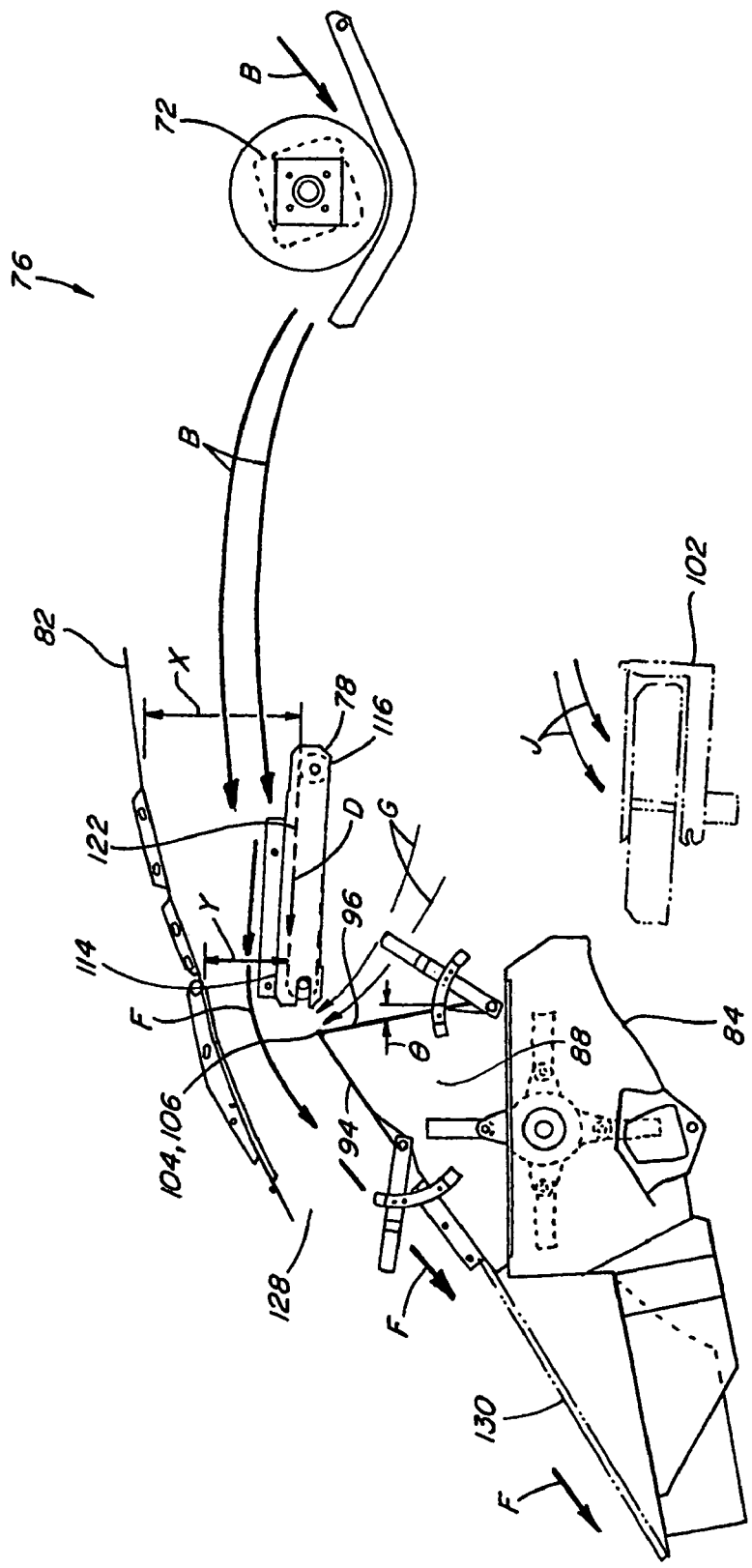
FIG. 11 is another simplified right side view of the discharge system of FIG. 7 illustrating the diversion of air from the cleaning mechanism, which serves to keep the leading edges of the chop/swath door and deflector/kickback door free of material build-up.

Focusing now on FIG. 11, it can be seen that when in the windrow mode with the crop residue flow F over the chopper 84, the chop/swath door 94 and the deflector/kickback door 96 can be optionally positioned to divert at least a portion of air from the cleaning fan 62 (FIG. 2), as denoted by arrows G. It is contemplated that this air is diverted up and over the leading edges 104, 106 of the chop/swath door 94 and the deflector/kickback door 96, which keeps crop material from building up on the leading edges 104, 106 and between the doors and the conveying mechanism 78. Chaff can still be handled by chaff spreader device 102, as denoted by arrows J.

More specifically, the deflector/kickback door 96 is positioned at an angle θ, of between about 5 and 20 degrees relative to vertical to direct air upwardly and rearwardly, as denoted by arrows G. As previously discussed, the leading edge 104 of the chop/swath door 94 preferably rests on the leading edge 106 of the deflector/kickback door 96, which serves to completely block the chopper opening 88 so that the chopper 84 does not take in the diverted air.

Adjacent to a front end 116 of conveying mechanism 78 the height from surface 122 to hood ceiling 82 directly thereabove is preferably within a range of from about 30 to 60 centimeters, and the height from surface 122 to hood ceiling 82 above a rear end 114 of the conveying mechanism is preferably within a range of from about 20 to 30 centimeters, the hood ceiling gradually tapering downwardly in the rearward direction such that surface 122 and hood ceiling 82 are in converging relation, front to rear, for facilitating the crop flow merging function discussed above.

Here, it should be noted that the height values X, Y and Z, and the values for angle θ are for purposes of illustration only and are not intended to be limiting.

Figure 12:
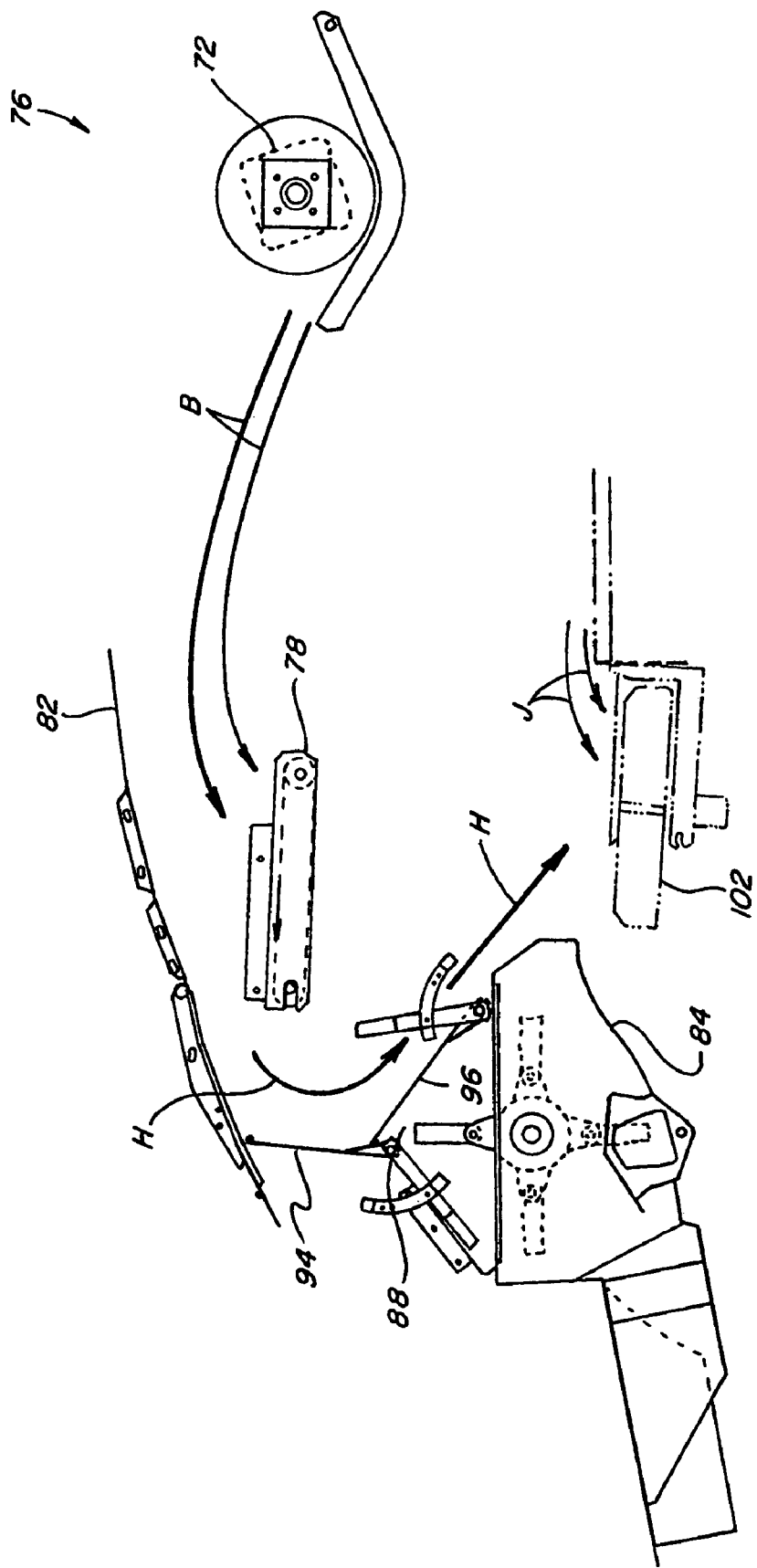
FIG. 12 is another simplified right side view of the discharge system of FIG. 3, in a "residue spreading mode"
Figure 13:
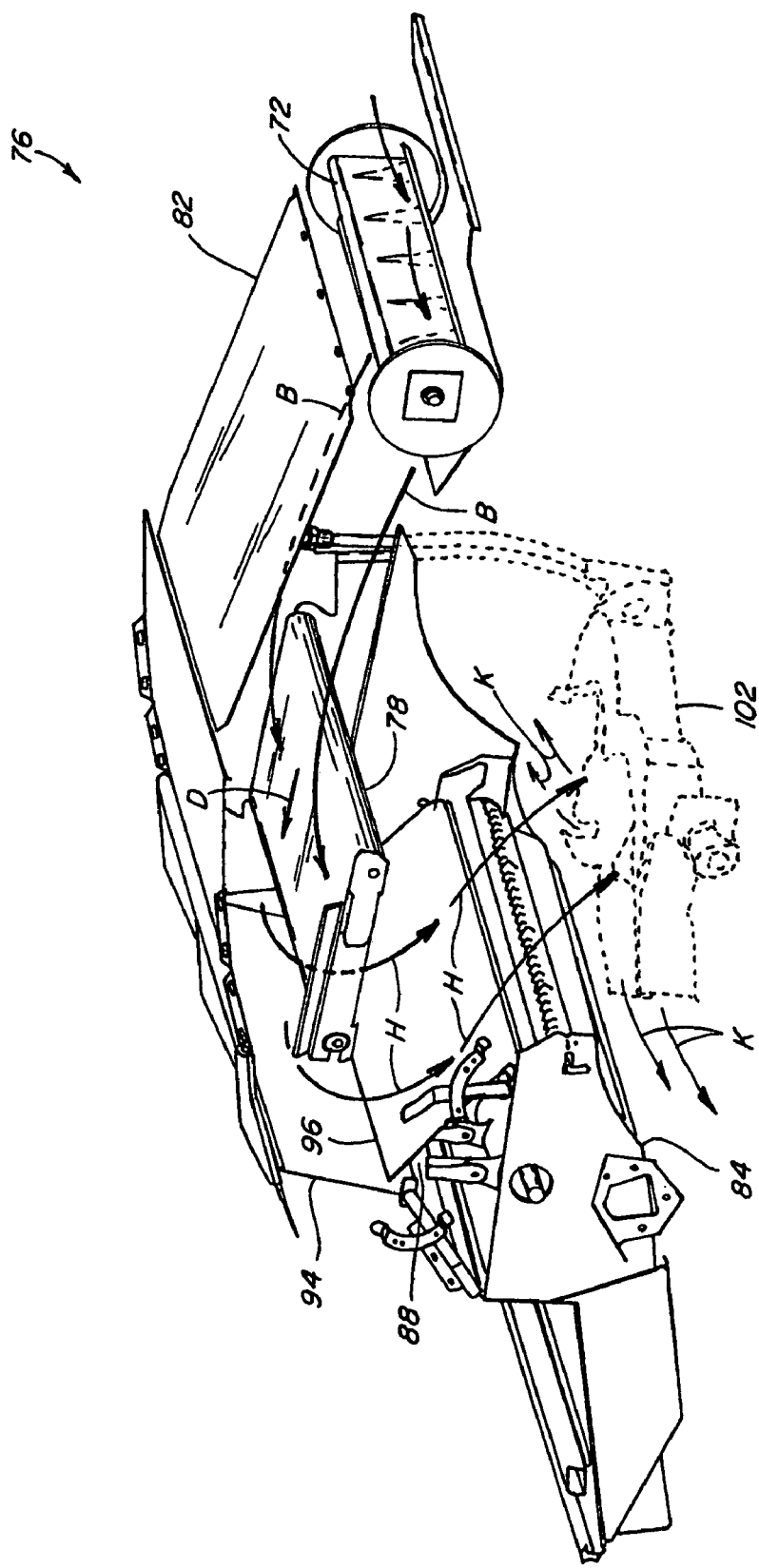
FIG. 13 is a right front isometric view of the discharge system of FIG. 12.

Turning now to FIGS. 12-14, the "residue spreading mode" of discharge system 76 is illustrated. Specifically, in FIGS. 12 and 13, the chop/swath door 94 and the deflector/kickback door 96 are configured to direct all crop residue (e.g. straw and chaff) into the chaff spreader device 102, as denoted by arrows H. Accordingly, the chop/swath door 94 is positioned generally vertical to disallow crop residue from being conveyed rearward and outward from the combine while the deflector/kickback door 96 is positioned generally at an angular orientation relative to the chop/swath door 94 to block the chopper inlet opening 88. Preferably all crop residue material will be diverted forward into the chaff spreader device 102, which will spread it, as denoted by arrows K (see FIG. 13). Notably, this mode is particularly useful for handling crops where the residue needs to be spread across the width of the cut, but not chopped. Chaff spreader device 102 also handles the chaff flow, denoted by arrows J.

Focusing on FIG. 14, illustrated is an alternative embodiment of the discharge system 76 in the residue spreading mode. More specifically, as shown, crop residue is diverted directly into the chaff spreader device 102, as denoted by arrows H, by the conveying mechanism 78 which is variably pivoted to an alternative position as shown. It is contemplated that the conveying mechanism 78 can pivot about its rear end 114 as shown, or alternatively, its front end 116, or either of its drive axes, to block travel of the crop residue to the chopper inlet opening 88. A deflector plate 118, which is preferably mounted to the underside of the hood ceiling 82 above conveying mechanism 78, and is positioned generally vertical so that its leading edge 120 abuts a non-moving portion of the conveying mechanism 78. This prevents rearward flow of the crop material. Again, chaff spreader device 102 also can handle the chaff flow, as denoted by arrows J. Also, the conveying mechanism 78 can be non-rotating, or the direction of rotation of the surface 122 of the conveying mechanism 78 as driven by drive 124 can be reversed, as denoted by arrow D1, to facilitate crop material flow H.

Figure 15:
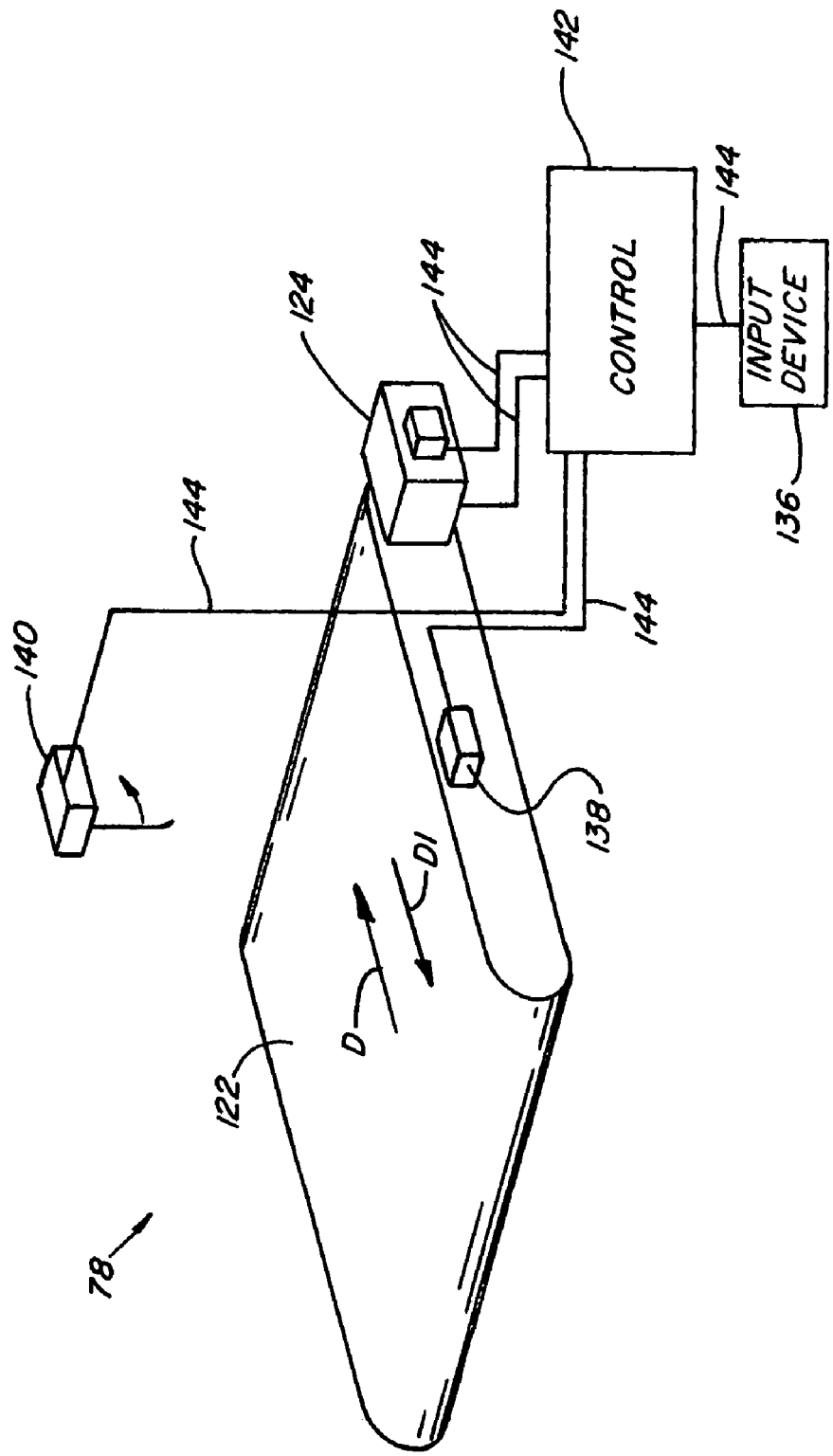
FIG. 15 is a simplified left front isometric view of the discharge system, showing a speed control for the conveyor mechanism

Referring also to FIG. 15, as noted above, the conveyor surface 122 of the conveying mechanism 78 can additionally be optionally automatically moved in directions D and D1 by drive 124 at variable speeds, either under manual control using a suitable input device 136 in operator's station 32 or elsewhere, or automatically, responsive to and in adjustment for different characteristics of the crop residue being received and/or other conditions, as represented by one or more predetermined parameters. Such parameters can include, for instance, but are not limited to, parameters sensed or determined by an element or elements of the header 34, the infeed mechanism 36, the rotor assembly 38, and/or the cleaning system 60, and/or sensors associated with the conveying mechanism 78, such as a load sensor 138 associated with surface 122 for sensing a load thereon, or a contact switch 140 disposed above the surface 122 which will make or break an electrical circuit responsive to contact with a mass of crop residue or straw being conveyed by the surface 122 or being fed into one of the processing devices such as the chopper 84, the spreader 102, or rearwardly from the combine. The speed can be controlled by a conventional commercially available processor based speed control, such as control 142, which can be connected to the drive 124 and the sensor and/or switch by a suitable conductive path, such as wires 144 shown. By such control the conveyor 78 can be sped up or slowed down, as required or desired to regulate crop residue flow into the handling device for optimizing output therefrom and for regulating the characteristics, such as consistency, cohesiveness and the like, of a windrow formed by the present system.

Accordingly, the present invention provides an improved system and method for positively discharging crop residue from a combine, the system and method allowing for precise and consistent delivery of crop residue from the threshing and separating area of a combine to the residue handling system or the rear of the combine. The present invention further provides a system and method for delivering crop residue to at least one of the chaff spreader, chopper, and exterior of a combine where the crop residue is positively discharged in a swath or windrow upon the harvested field below the combine. Finally, the present invention also provides a system and method for reducing and alleviating crop residue blockages at the rear of the combine, thereby reducing combine down time and increasing harvesting productivity and customer satisfaction.

Although an exemplary embodiment of the system and method for positively discharging crop residue from a combine has been shown and described with reference to particular embodiments and applications thereof, it will be apparent to those having ordinary skill in the art that a number of changes, modifications, or alterations to the invention as described herein may be made, none of which depart from the spirit or scope of the present invention. All such changes, modifications, and alterations should therefore be seen as being within the scope of the present invention.

What is claimed is:

1. A method for forming a windrow on a harvested agricultural crop field as crops are harvested by an agricultural combine, comprising steps of:

providing a body defining an internal space containing a separating system, the body having a generally rearwardly facing rear opening defined therein in connection with a rear end of the space, a rotary crop residue chopper having an upwardly facing inlet opening disposed in a lower portion of the rear end of the space, the rear opening being located rearwardly of the separating system and the inlet opening of the chopper;

providing a door arrangement disposed in the rear end of the space, the door arrangement pivotable between a first configuration and a second configuration, wherein the door arrangement closes the rear opening and directs at least a portion of the flow of crop residue into the inlet opening of the chopper in the first configuration, further wherein the door arrangement covers inlet opening of the chopper and directs the flow of crop residue rearwardly and outwardly from the space through the rear opening in the second configuration, wherein the door arrangement has at least two doors which are positioned in spaced apart opposing relation to form a chute directed into the inlet opening of the chopper when the door arrangement is in the first configuration, further wherein at least one of the at least two doors is positioned to form a ramp directed downwardly toward the rear opening of the body when the door arrangement is in the second configuration;

directing an airborne flow of straw in a predetermined direction through the internal space of the combine such that at least a portion of the flow is deposited on a conveyor mechanism moving in the predetermined direction through the space;

combining the portion of the flow deposited on the conveyor with any remaining airborne portion of the flow as the portions of the flow are moved in the predetermined direction to form a generally cohesive flow of the straw having a reduced overall vertical extent compared to an overall vertical extent of the airborne flow; and discharging the cohesive flow of the straw from the combine onto a surface extending downwardly at least partially to the harvested crop field such that the straw is laid onto stubble of the harvested crop as an elongate mat of the straw.

2. The method of claim 1 wherein the method further comprises operating a controller to control the movement of the conveyor mechanism in the predetermined direction through the space at a variable speed, the controller controlling the speed responsive to at least one predetermined parameter.

3. A method for forming a windrow on a harvested agricultural crop field as crops are harvested by an agricultural combine, comprising steps of:

providing a body defining an internal space containing a separating system, the body having a generally rearwardly facing rear opening defined therein in connection with a rear end of the space, a rotary crop residue chopper having an upwardly facing inlet opening disposed in a lower portion of the rear end of the space, the rear opening being located rearwardly of the separating system and the inlet opening of the chopper;

providing a door arrangement disposed in the rear end of the space, the door arrangement pivotable between a first configuration and a second configuration, wherein the door arrangement closes the rear opening and directs at least a portion of the flow of crop residue into the inlet opening of the chopper in the first configuration, further wherein the door arrangement covers inlet opening of the chopper and directs the flow of crop residue rearwardly and outwardly from the space through the rear opening in the second configuration, wherein the door arrangement has at least two doors which are positioned in spaced apart opposing relation to form a chute directed into the inlet opening of the chopper when the door arrangement is in the first configuration, further wherein at least one of the at least two doors is positioned to form a ramp directed downwardly toward the rear opening of the body when the door arrangement is in the second configuration;

directing an airborne flow of straw in a predetermined direction through the internal space of the combine such that at least a portion of the flow is deposited on a conveyor mechanism moving in the predetermined direction through the space;

combining the portion of the flow deposited on the conveyor with any remaining airborne portion of the flow as the portions of the flow are moved in the predetermined direction to form a generally cohesive flow of the straw having a reduced overall vertical extent compared to an overall vertical extent of the airborne flow; and discharging the cohesive flow of the straw from the combine onto a surface at a substantially non-vertical angle so as to form a cohesive windrow profile on top of stubble of the harvested crop, wherein subsequently the discharged cohesive flow of the straw impacts the cohesive windrow profile before the discharged cohesive flow of the straw lays onto stubble of the harvested crop.

4. The method of claim 3 further comprising varying the speed of movement of the conveyor to control the angle of trajectory of the discharged cohesive flow of the straw.

5. The method of claim 4 further comprises controlling the angle the discharged cohesive flow of the straw impacts the cohesive windrow profile so that at least a portion of individual straw members of the cohesive flow of the straw are oriented within the cohesive windrow profile substantially vertical with respect to the surface.

6. The method of claim 4 further comprises controlling the angle the discharged cohesive flow of the straw impacts the cohesive windrow profile so that at least a portion of individual straw members of the cohesive flow of the straw are substantially suspended in air by the cohesive flow of straw such that the at least a portion of individual straw members do not contact the stubble of the harvested crop.

\* \* \* \* \*